(12) United States Patent
Marella

(10) Patent No.: US 8,631,384 B2
(45) Date of Patent: Jan. 14, 2014

(54) CREATING A TEST PROGRESSION PLAN

(75) Inventor: Pietro Marella, Rome (IT)

(73) Assignee: International Business Machines Corporation, Armonk, NY (US)

( * ) Notice: Subject to any disclaimer, the term of this patent is extended or adjusted under 35 U.S.C. 154(b) by 456 days.

(21) Appl. No.: 13/081,121

(22) Filed: Apr. 6, 2011

(65) Prior Publication Data

US 2011/0296371 A1 Dec. 1, 2011

(30) Foreign Application Priority Data

May 26, 2010 (EP) .................................... 10163900

(51) Int. Cl.
*G06F 9/44* (2006.01)
(52) U.S. Cl.
USPC .......................................... 717/101; 717/124
(58) Field of Classification Search
None
See application file for complete search history.

(56) References Cited

U.S. PATENT DOCUMENTS

| | | | |
|---|---|---|---|
| 6,546,506 B1 | 4/2003 | Lewis | 714/38.1 |
| 7,313,564 B2 * | 12/2007 | Melamed et al. | 717/124 |
| 7,673,179 B2 * | 3/2010 | LaBanca et al. | 714/38.14 |
| 8,479,164 B2 * | 7/2013 | Becker et al. | 717/124 |
| 2005/0223295 A1 * | 10/2005 | Hermes et al. | 714/38 |
| 2008/0010543 A1 | 1/2008 | Yamamoto et al. | 714/38.1 |
| 2009/0006147 A1 * | 1/2009 | Padmanabhan | 705/7 |
| 2009/0300585 A1 * | 12/2009 | Meenakshisundaram et al. | 717/124 |
| 2011/0066890 A1 * | 3/2011 | Bassin et al. | 714/37 |
| 2011/0088014 A1 * | 4/2011 | Becker et al. | 717/125 |

OTHER PUBLICATIONS

Panda, "Regression Test Case Traceability and Selection Methodology," infosys, 2009.*
Afzal, "Metrics in Software Test Planning and Test Design Processes," Jan. 2007.*
Kan et al., "In-Process Metrics for Software Testing," IBM, 2001.*
Mazimilien at al., "Assessing Test-Driven Development at IBM," IEEE, 2003.*
Kan, "Measuring and Managing In-process Software Quality," IBM, 2009.*
"S-Curve," Project Management Knowledge, 2007.

* cited by examiner

Primary Examiner — Insun Kang
(74) Attorney, Agent, or Firm — VanLeeuwen & VanLeeuwen; John D. Flynn

(57) ABSTRACT

Automatically creating a progression plan for a software test, by computing for each test period unit x the effort for attempting to perform test units, ATTx, and the effort for completing test unit execution, CCx. Three variables characterizing the test strategy are introduced in the computation: the Effectiveness, which represents the efficiency of the test team, the Defect Density rate, and the Verify rate value. By choosing the test strategy, the test manager defines the three variables' values which influence the progression plan. During test execution, a cumulative 'attempted' curve of the ATTx values and a cumulative 'complete' curve of the CCx values allow the test manager to compare the effort already made to the effort expected to be made for the Test Units which have been attempted and for the Test Units which have been completed, i.e. when the defects found in the code have been corrected.

13 Claims, 7 Drawing Sheets

For week x,

Inputs:
Effectiveness = $E_x$
Defect Density Rate = $DDR_x$
Verify Rate = $V_x$

Computation of the preferred embodiment:
Capacity = $C_x = E_x * R_x$
Attempted = $ATT_x = C_x - REG_x$ —310

Incoming Defects = $DI_x = D_x * ATT_x *$ $\dfrac{\text{total\_number\_of planned defects}}{\text{total test cases* time to execute test case + total\_number\_of planned defects* time to manage defect}}$ —300

Failure = $FF_x = DI_x *$ = time\_to\_manage\_defects
Attempted with success = $SUC_x = ATT_x - FF_x$
Regressed = $REG_x = V_x * \Sigma FF_i$ (i = 1..X-1) —320
Completed = $CC_x = SUC_x + REG_x$ —330

Simple Computation: 380
Capacity $C_x = R_x$
Attempted = $ATT_x = C_x - REG_x$

Incoming Defects = $DI_x = ATT_x *$ $\dfrac{\text{total\_number\_of planned defects}}{\text{total test cases* time to execute test case + total\_number\_of planned defects* time to manage defect}}$ Failure = $FF_x = DI_x *$ time\_to\_manage\_defects
Attempted with success = $SUC_x = ATT_x - FF_x$
Regressed = $REG_x = \Sigma FF_i$ (i = 1..x-1)
Completed = $CC_x = SUC_x + REG_x$ Curve Y axis values: 340
Cumulative Failure = $CumFF_x = \Sigma FF_i$ (i = 1 ..x)   350
Cumulative Attempted = $CumATT_x = \Sigma ATT_i$ (i = 1 .. x)
Cumulative Completed = $CumCC_x = \Sigma CC$ (i = 1 ..x) —360
Cumulative Incoming Defects = $CumDI_x = \Sigma DI_i$ (i = 1 ..x)
370

FIG. 3

CREATING A TEST PROGRESSION PLAN

RELATED APPLICATIONS

This application is based on and claims the benefit of priority from European Patent Application EP 10163900.3, filed May 26, 2010.

BACKGROUND

Software development is performed in stages, from a first stage of designing a solution to answer a well identified problem, to code writing when implementing the solution, to the last step being testing this code. Planning cost and duration of each of these stages is critical to determine the business case for proceeding with the software development and for properly planning the date of availability of the software.

Some techniques exist for automatically generating test plans, however, the inventors herein recognized that a more complete test plan is needed both for following progress in test execution and for knowing in advance the plan of defects in the code the development team will have to manage. Other techniques include test planning assistance for following test progression which includes providing, for a given project, a number of man-days estimated to be required for subsequent test execution in the current test project and an estimated time period. The method uses as input past test execution information and the number of involved workers already captured from this project and other projects. The method includes creating a table of the past values of test duration performances and providing average performing information on the past values. A linear function schedule is built. The method allows analysis of the actual data against the linear function schedule. A test progress graph is displayed which takes into account the first results of the current test.

However, the inventors herein recognized that there is a need for modelizing test progression using a more sophisticated estimation of the test plan than a linear function schedule. This estimation would be used to have a view, even before the test starts, and also to monitor the test progress during the test execution period. Many models exist based on the learning curve of software developer(s) during the software development cycle. S-curves learning curves are used to represent the various expenditures of resources in project management, the resources consisting in a human staffing resources or material resources such as supplies, services, commodities and budgets. The S-curves display a history dependent progression from small beginnings that accelerates and approaches a climax over time. Their mathematical Sigmoid function formula include an exponential function of time when expressing the progression: $P(t)=1/1+e^{-t}$

SUMMARY

One embodiment of the invention is a method for automatically creating a progression plan for a software test over a test period including test period units x, the software test having in plan a certain number of planned test resources Rx per each test period unit x, the method including, for each test period unit x, recursively computing the number of test attempted effort ATTx representing the effort spent by the planned resources to attempt to perform test unit execution, based on said test resources Rx and on the test regression effort REGx representing the effort spent by the planned test resources to manage defects found in the test period unit x−1, and computing test completion effort CCx representing an estimate of the effort spent by the test resources for completing test unit execution, based on the test attempted effort ATTx and the test regression effort REGx, said completed effort computed for each period unit x being test progression plan data.

Another embodiment of the invention is a computer program product including programming code instructions for executing the steps of the method described above when the program is executed on a computer.

Another embodiment of the invention is a system for automatically creating a progression plan for a software test, the system including components for carrying out the methods described above.

BRIEF DESCRIPTION OF THE DRAWINGS

The present invention may be better understood, and its numerous objects, features, and advantages made apparent to those skilled in the art by referencing the accompanying drawings, wherein:

FIG. 3 is further detailed description of Test Progression Plan curve computation according to an embodiment of the invention;

DETAILED DESCRIPTION

Figure 1:
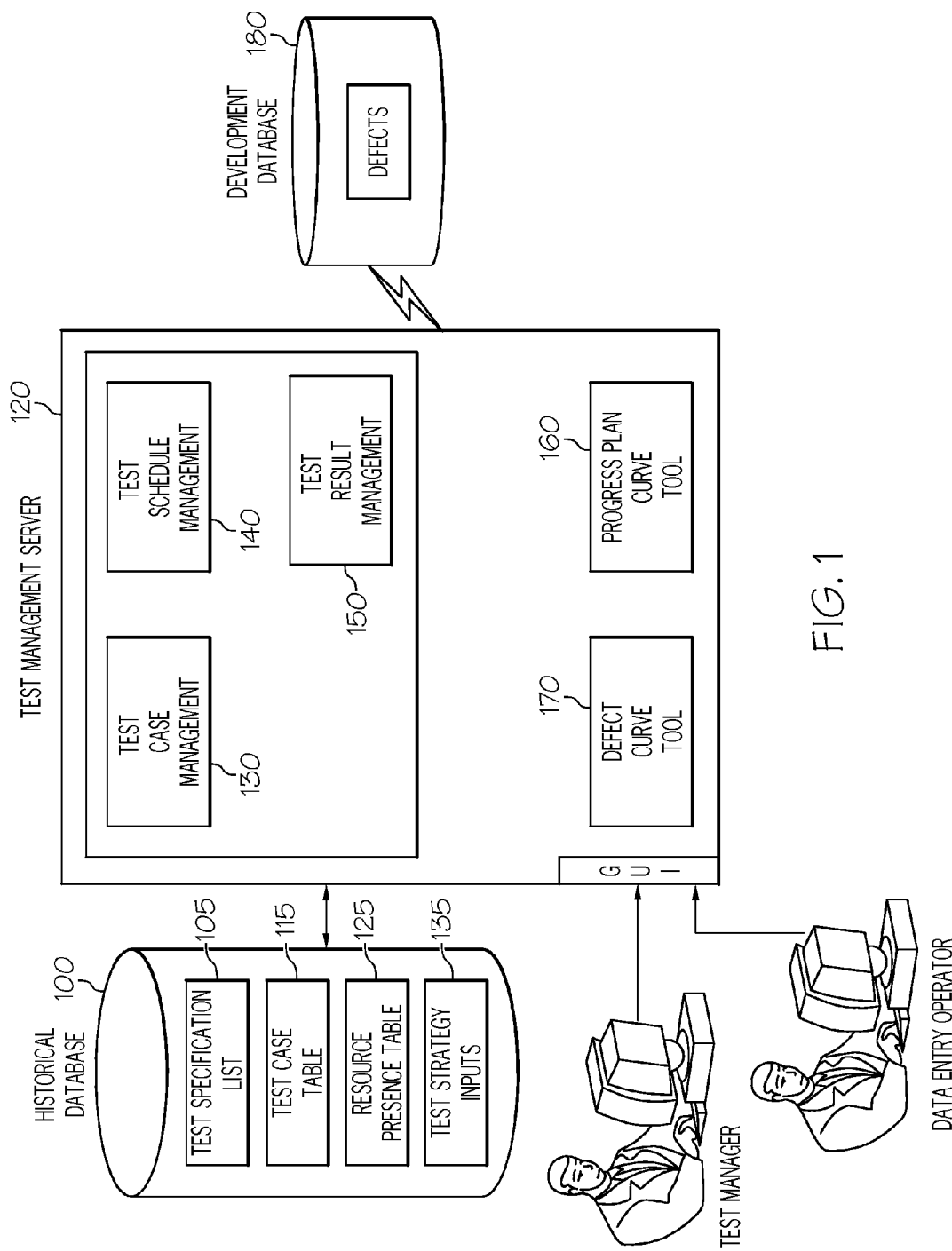
FIG. 1 shows the system environment in which is implemented the test management method according to an embodiment of the invention.

The present invention provides a method, system, and computer program product to modelize test progress by providing an estimation of the test progress even before the test starts, and by helping to monitor the test progress during its execution. Furthermore, the test progress model takes into account specificity of the different phases of testing software and realistic information going along with test development, such as the estimate of the availability of the human resources and the test strategy.

Progress plan curves are built automatically based on inputs collected by the test manager from current test information and historical data coming from previous test executions. Starting from a test plan which provides a distribution of the resources for each test period unit (each week for instance), the distribution of the resources for each test period unit can also be computed by using as input the presence of the resource (the tester vacation plan) which is more accurate than theoretical people resources.

The progression plan curves provide, for each test period unit, the test effort which is dedicated for attempting to execute test cases and the test effort which is dedicated for completing test case execution using the resources for the test period unit.

In order to obtain a more accurate progression plan, the test manager can use three additional new inputs characterizing the test strategy: the effectiveness, defect density arrival rate, and verify rate. The resulting progression plan curves will reflect the three variable values for each test period unit.

An optional Defect Plan Curve derived from the test progression plan curve provides the number of defects the test team can solve per period of time.

The execution plan of the prior art illustrating the distribution of the resources over the test period is a linear curve. This is not the case with the progress plan curves of the present invention, which has the advantage of providing a closer reflection of the "real world" in which the distribution of the resources over time is influenced by different factors. For example, the velocity of the team depends on the knowledge of the product under test, the availability and preparation of the environment where the test is executed, the availability of the code itself or of the code to fix any defect found. The velocity can also be slowed by a high defect rate discovery. All these factors are summarized in a described embodiment of the method of the invention with the use of three variables chosen as having an influence over the test progression. To these three variables is added the resource presence planned week by week.

S-Curves of prior art, that are generically used to define the adoption rate of new technologies, follow a typical progression: introduction, growth and maturation of innovations as well as the technical cycles that most industries experience. The S-Curve has been adopted in test planning to define a test progression curve, but the progress plan curves of the present invention provide a more complete and valid estimation, because, for instance, it takes into account the team resource presence over the period (test phase) that can influence the progression curve in a considerable way: the S-curve based progression plan is based on average presence of the resources but this is not always the case because test teams can change over time. The S-curve may have shown a maximum growth while a part of the test team is not available (due to vacations, education, etc. . . . ). Moreover, factors like the number of defects in the code and strategy of test execution do follow a different trend, and can not be adequately captured by an S-curve.

The progress plan curves of the present invention are based on attempted and completed test cases, helping to make the curves particularly valid. Furthermore, the three variables described below reflect the test strategy and therefore make the progress plan still more accurate. Also, as explained below, the progression plan curves are used during test execution as a point of comparison with the way the resources have been already used in the past test periods.

FIG. 1 shows the system environment in which is implemented the test management method according to an embodiment of the invention. The system environment for test planning includes a Test Management server (120) which is accessed by the test manager and data entry operators preferably through a graphical user interface. The system environment includes a historical database (100) manually filled in by test operators, by the test managers, or automatically filled by programs. The data are stored for the past test executions and for the current executing tests. A system environment for test management includes software applications executed on a Test Management server (120) by the test manager which can be organized as now described.

The Test Case Management application (130) manages test specification by identifying the test scenario formed of a certain number of test cases to be executed for this new test. This application uses a Test Case table (115) in the Historical Database (100) which describes the lists of test cases and for each test case the test case description, the software and hardware need for their execution, the costs in terms of people resources.

One other application used for test planning is the Test Schedule Management application (140) which allows the test manager to create a test execution plan which gives the test duration, taking into account both historical data on tests and some inputs on the current test entered by the test manager.

The Test Schedule Management application (140) uses as input the Test Specification Table (105) in the Historical Database (100), which describes the historical data on tests already executed and historical people efficiency for test execution. Information used and computed (test execution plan) for the test are stored in the historical database (100) for this test.

The Test Result Management application (150) is a tracking tool to compare the test execution plan created by the Test Schedule Management application (140) to the real results during test execution. This information can be illustrated by two curves on the same graph, one for the target and one for the result, typically used by the test manager. This application reads information stored for the current test in the Historical Database (100). The test manager can adjust information according to the comparison of the two curves on the basis of the test execution plan.

Another component, the Progress Plan Curve Tool (160) allows creation of a progress plan curve which represents the expected test progress. It uses the test execution plan duration as resulting from the Test Schedule Management (140), and takes into account historical data on test strategy which are new data stored in the Database. Before a test is started a strategy is decided. An important question is how to find the parameter value starting from a test strategy. The test manager will see with the complete Test Progression Plan curve the implication of the test strategy. For instance, the test manager will create a complete progress curve upon a test strategy of asking the test team to first perform the test corresponding to the new functions introduced in the software to be tested and to perform in a second phase the regression tests on the function already implemented in the product. The test manager will compare the complete progress curves corresponding to the two strategies and will choose the best case. In one embodiment, the test strategy inputs are defined with three parameters: the efficiency, the defect density and the verification rate. The test strategy information is stored as the Test strategy inputs (135) in the Historical Database (100). The test progress curve is then computed based also on a presumed availability of resources (for example vacation plan) for all the test duration as new inputs stored, for instance, in the Resource Presence Table (135) of the Historical Database (100). This progress plan curve can provide a progression plan even when the test is not yet started.

The Defect Curve Tool (170) component provides defect plan curves derived from the progress plan curves which provides the number of defects handled for each period of time for each test. The defect information is created in the system environment of the developers and testers. The defect database (180) is, for instance, remotely accessed by the Defect Curve Tool (170). As with the progress plan curve, a defect plan curve can be drawn when the test is not yet started.

Those skilled in the art will note that a Test Execution plan may be generated in a variety of ways, and that currently and/or previously generated Test Execution plans may be used in conjunction with the Progress Plan Curve Tool (160) and the Defect Curve Tool (170). Furthermore, in one embodiment, the test manager can first start computing a Test Execution plan and later on, when he can collect more precise information on resources (who are the resources, what will be their vacation plan, for instance) he can start using the Test Progression plan with the Progress Plan Curve Tool (160) and the Defect Curve Tool (170).

Figure 2:
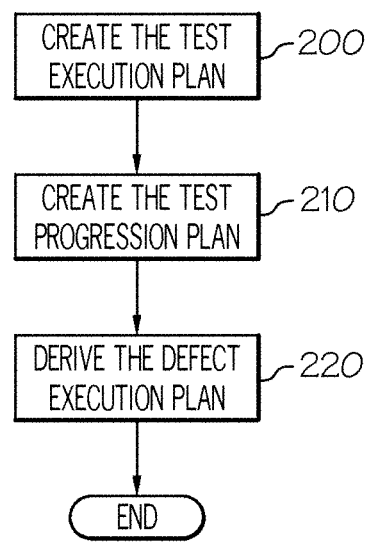
FIG. 2 is a flowchart of the test management method of the invention according to one embodiment of the invention.

FIG. 2 is flowchart of the test management method of the invention according to one embodiment of the invention. There are three main steps: create a Test Execution Plan (200), create a Test Progression Plan (210), and derive a Defect Plan (220). The first step of the method is executed by the test manager to create a Test Execution Plan (200) using the Test Schedule Management applications known to those skilled in the art. For example, see U.S. Pat. No. 6,546,506, where the test plan splits the number of hours available for work per time period (per week for instance) on all a test duration.

The following historical data are used: the average number of hours to execute a test case and to identify and document a defect (time to manage a defect); the productivity factor of the personnel.

Some data are entered by the test manager, such as the defined number of test cases and defects and the number of personnel for the test.

Using the number of personnel for the test, a per week number of hours theoretically available is computed to which is applied the productivity factor to obtain a more appropriate estimate. A diminishing value is then applied to mitigate the productivity factor reflecting the reasoning that the test team may grow.

Using the defined number of test cases and defects and the average number of hours to execute a test case and to identify and document a defect (time to manage defects), the total test duration is computed in number of weeks for instance.

Starting from the test duration found in the Test Execution Plan, the second step consists in providing the Test Progression Plan (210). The Test Progression Plan provides what is called the test effort per week, which is measured as a number of work hours, for instance for all the weeks of the test period. It is computed by reuse of the Test Execution Plan information and, according to the present invention, which takes into account test strategy, three new inputs may be used which are the Effectiveness, the Defect Density arrival rate, and the Verification rate, and a last input which is the resource planned presence (the vacation plan of testers). The three input values are dependent on the test strategy chosen by the test manager. They can be estimated based on the experience by providing an initial value which is improved with each test progression plan or, the following formula can be used:

Effectiveness: the efficiency of the test team is not always the same during the test phases. It tends to follow a parabolic curve, because of the initial friction caused by several factors (learning curve, code instability, environment preparation/availability), then there is a period where the efficiency is at very high level, to decrease through the end of the test, where other factors such as team motivation which may decrease with time or if the team has to perform more complex scenarios or that needs special software or hardware configuration not easy to get. So the test strategy will be to choose a test scenario which follows the expected Effectivness.

$E_x$=Effectivness for week $x$ $$E_x = \frac{1}{\sqrt{2\pi\sigma^2}} e^{\left(\frac{(x-\mu)}{2\sigma^2}\right)} \quad (A)$$

Distribution of the Effectiveness over the elapsed test duration (x=weeks) depends on 2 factors: the variation of effectiveness expected over the time ($\sigma$), and when the maximum effectiveness of the team is expected ($\mu$). These values are entered by the test manager through the Progress Plan Curve Tool.

The Defect Density arrival rate $D_x$ depends on the test strategy the test manager decides or needs to apply. An example would be if the test starts from regression on old functions of the software product, it is reasonable to expect less defects to be found than the average at the beginning of test period and a higher defect density than that average at the end of the test period; while, in the opposite way, by starting test with testing the new functionality, there will be more defects at the beginning of the test period and the defect density will be lower than the average at the end of the test period.

$$D_x = 1 \frac{1}{\sqrt{2\pi\sigma^2}} e^{\left(\frac{(x-\mu)^2}{2\sigma^2}\right)} \quad (B)$$

where $\mu$ and $\sigma$ are input by the Test Manager based on the defect removal efficiency expected (maturity of team, maturity of code).

The (B) formula can be used to automatically compute the Defect Density arrival rate. The value can also be based on experience on previous tests, from the historical database or by default value provided by the graphical user interface used by the Progress Plan Curve application.

The Verify rate value indicates the percentage of work hours to be spent to verify the defects (so working on failed scenarios more than on attempt new scenario). At the very beginning the Verify rate will be 0, while it usually will increment through the end of the test.

$$V_x = \log_a x \quad (C)$$

where a=verification strategy, a decimal value between a prefixed range (between 1 and 10 for instance) which is entered by the test manager through the Progress Plan Curve tool. The a verification strategy controls the growth of the Verification Rate over the weeks (from a moderate growth (lower bound) to an aggressive growth (upper limit)).

The (C) formula can be used to automatically compute the Verification rate. The value can also be based on experience on previous tests, from the historical database or by default value provided by the graphical user interface used by the Progress Plan Curve application.

As an example, if the test manager has entered the following values:

| Effectiveness | $\mu$ | 7.12 |
| --- | --- | --- |
| | $\sigma$ | 3.88 |
| Defect Density Variable rate | $\mu$ | 6.22 |
| | $\sigma$ | 4.78 |
| Verification rate | a | 9.32 |

Figure 4:
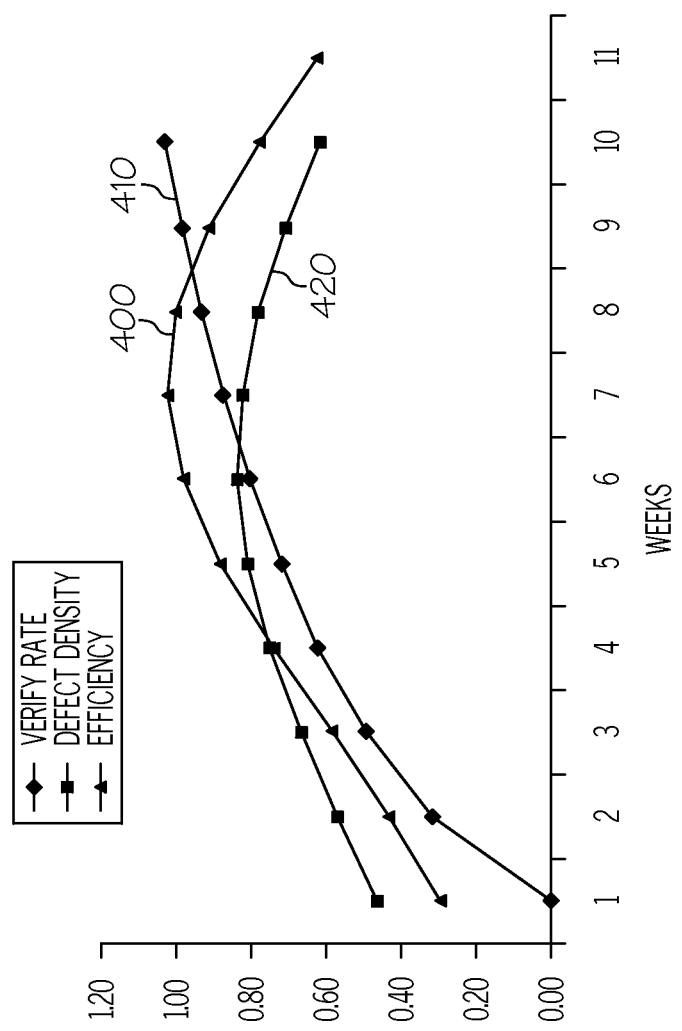
FIG. 4 illustrates the evolution of the three input values when their parameters $\bar{\mu}$, $|\sigma$ and a have been entered by the test manager according to an embodiment of the invention.

The resulting distribution of three inputs over the weeks will be as seen in FIG. 4 in which for the test duration of 10 weeks, the Y axis representing the three input values, curve 400 is the Effectiveness, curve 410 is the Verify rate and curve 420 is the Defect Density Variable rate.

It results that the peak of effectiveness is expected around week 7, the effectiveness will grow slowly, the maximum number of defects in the product is reached around week 6, and still the number of defects week by week will not decrease dramatically at the end of the test phase, the verification rate will follow a regular and constant growth over the time.

Consequently, the test manager will choose the values of the parameters used to compute the Effectivness, Defect Density Variable rate and Verification rate. The value of these parameters will influence the curves. The parameter values are set by the test manager according to the test strategy for Effectivness, the code quality he estimates for the Defect Density Variable rate and the expected evolution of the competence of the team to make verifications for the Verification rate. Once chosen by the test manager, the progression plan curves will be automatically computed on this basis.

A fourth information is used as input to the computation of the Test Progression Plan which is, day by day on each week, the planned presence of resource (1=planned to be present, 0=planned vacation). Then is summarized how many resources would be actually present week by week. In the table below in the initial 2 weeks, only 0.5 resources are planned for the test. Availability information is also used to introduce some "unplanned" absence of resources (for example because of illness). In the example below, 0.97 of availability means that the probability that resources allocated for that week is not 0.5 but less, is only 0.03%.

| Week | Data | 03 Jul. 2006 | 10 Jul. 2006 |
|---|---|---|---|
| PLANNING | #Num | 4 | 5 |
| Team | Planned | 0.5 | 0.5 |
|  | Availability | 0.97 | 0.97 |
|  |  | 0.5 | 0.5 |

The expected availability information as well as the planned presence may be stored is the Historical Database as the Resource Presence Table (125). However as these information are personal they may be also accessed with a password protection on a remote database.

FIG. 3 is further detailed description of Test Progression Plan curve computation according to an embodiment of the invention. The test plan provides the number of resources (expressed in people or work hours for instance) which will be used for each test time unit, each week for instance, over the entire test period. The resources that will be used week x, Rx, represent the test capacity during week x. The progression plan is then computed; it provides the test effort for each week (which can be expressed in number of work hours or in points, one point being one work hour) corresponding to test execution attempted to be executed and the test effort for test execution completed. During week x the test comprises a certain number of test cases to be executed and some will be executed with success (there will be attempted and completed) and for some of them there will be some failures. These test cases will not be completed but just attempted. The Plan progression curves will illustrates the progression of attempted test effort and completed test effort for each week of the test period. The test manager, by automatically displaying the attempted and completed test effort curves, can see the expected acceptable failures to complete the test in the given period of time.

Optionally, instead of using the theoretical resources available per week, the resource available per week can be computed taking into account the vacations of the people for testing; the tester vacation plan is stored in the presence table. This allows a more realistic resources computation per week Rx.

The test capacity, Cx, can be estimated by Rx. However this value may be computed more accurately according to an embodiment of the invention by using the Effectivness value, Ex, computed either empirically or using the (A) formula. The Effectivness, Ex, is chosen by the test manager, by the choice for instance of the $\sigma$ and $\mu$ parameters in formula (A), to qualify the test strategy. One obtains the effort capacity for week x:

$$Cx=Ex*Rx$$

During the test execution, the defect processing comprises a first phase of identifying, documenting, and correcting the defects by changing the code, which is the Attempted phase (ATT). Then, the regression phase (REG) is for checking that no other errors were introduced in the process of correcting the defect. So the corresponding effort for test execution in attempted phase in week x is:

$$ATTx=Cx-REGx (310)$$

The test effort for regression phase during week x, REGx, depends on the number of defects found in the code. Known from the inputs for the plan execution phase, the total number of planned defects can be used to compute the test defect density (300) by dividing the total number of planned defects by the total resources to be used for the test which is, for instance, the number of test cases for the test multiplied by the average resources for a test case execution. The effort to process incoming defects for week x (Dlx) depends on the effort for attempted phase ATTx and the test defect density (300). The test defect density is the total number of defects for the test/total effort for the test. The total effort for the test is the effort for executing test units of the test (total number of test units*time to execute a test unit) added to the effort for managing all the defects of the test (total number of defects*time to manage a defect).

However, the Dlx value may be computed more accurately according to an embodiment of the invention using the Defect Density rate (Dx) which is the second input computed, for instance as described in FIG. 2, computed either empirically or using the (B) formula. The Defect Density rate (Dx) is chosen by the test manager, by the choice for instance of the $\mu$ and $\sigma$ parameters in formula (B), to qualify the test strategy (choosing if the defects density is higher at the beginning or at the end of the test period).

Using the average time to manage a defect (historical data used for building the Test Execution plan) and the effort to process incoming defects for week x (Dlx), one obtains the resources used for code failure (FFx). The total of resources used for running test cases during week x comprises the resources used on code failure and resources used for successfully running test cases (SUCx).

The cumulative amount of resources used on code failure for the x first weeks, FFx, is an estimate of the effort for test Regression at week x:

$$REGx=SFF_i (i=1 \ldots x-1)$$

knowing also that the first week, week 1, the regression resources $REG_1=0$, ATTx=Cx−REGx, can be recursively computed.

It is noted that the REGx value which is the effort for regression phase during week x, may be computed more accurately according to an embodiment of the invention using the Verify Rate coefficient, Vx, for instance as computed in the description of FIG. 2, either empirically or using the (C)

formula. The Verify Rate coefficient is chosen by the test manager by the choice for instance of the a parameter in formula (C) as being for instance higher at the middle of the test period when the test team is mature.

$$REGx = Vx * SFF_i \, (i=1 \ldots x-1)$$

Knowing also that the first week, week 1, the regression effort is null, for instance, $ATT_x$ can be recursively computed.

The effort for completed test execution (330) comprises the effort for successively completing test cases (SUCx) added to the computed effort for regression (REGx). One can also use the formula:

$$CCx = REGx + ATTx - REGx+1$$

The Test Progression Plan is qualified by having the estimate, for each week x, using the computation as described above, of the following variables: Cumulative resources for Failure processing (340), Cumulative resources for attempted test case execution (350), Cumulative resources for completed test cases (360) and Cumulative number of Incoming Defects (370).

Consequently, in one embodiment, a basic progression plan curve computation based on the execution plan is enriched with the use of the three variables. Another embodiment of progression plan curves computation can consist in applying the method for automatic computing without using the three variables (380) as shown in FIG. 3.

Figure 5:
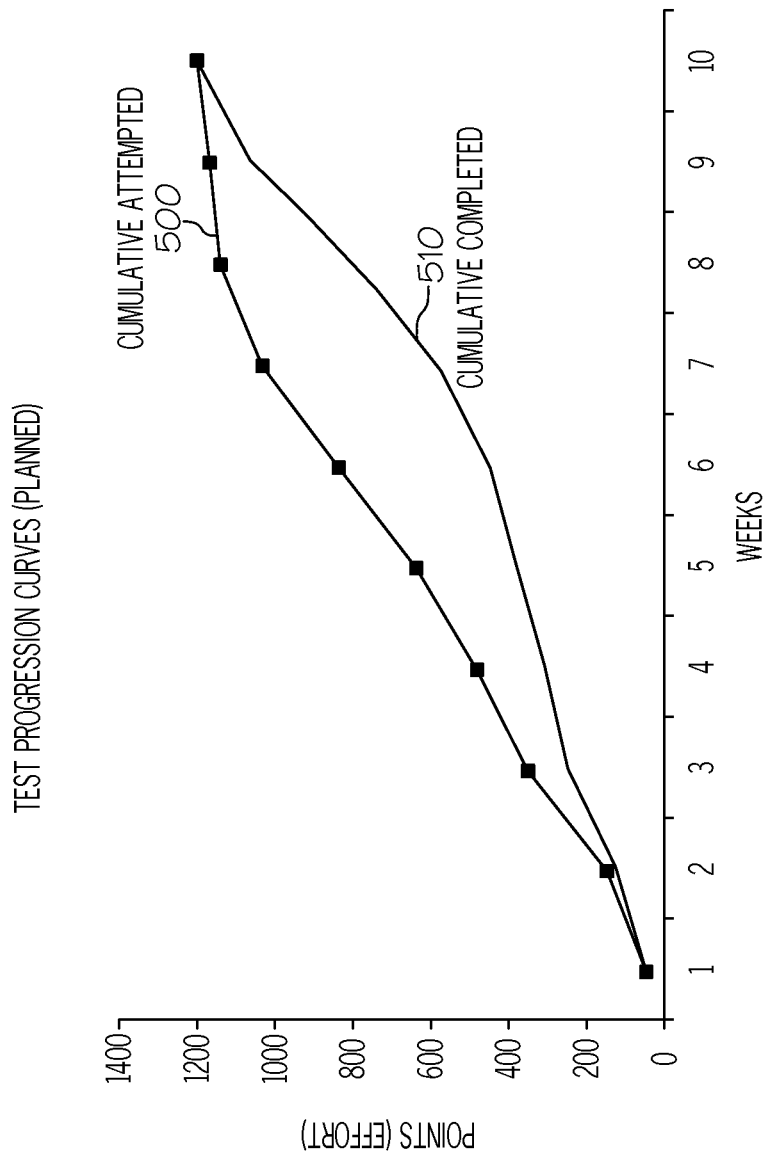
FIG. 5 is an example of Test Plan Progression curves computed with an embodiment of the invention.

FIG. 5 is an example of Test Plan Progression curves computed with an embodiment of the invention. The two curves of FIG. 5 are drawn by the test manager using the Progress Plan curve tool (170) once the progression plan is computed, before and during the test period.

Optionally, to simplify computation, one can use 'points' as unit to qualify an 'effort': for instance, 1 point may represent an effort equivalent to 1 person hour. The total effort of a test case is the number of points associated to this test case. The point unit is chosen to draw the two curves of FIG. 5. Starting from a test plan where the test manager estimates the resources in terms of the number of people who will work on the test, the computation of the progression plan will only consider the effort in terms of number of hours of work or effort which are necessary for performing such a test due to test characteristics and additionally the test strategy. That is why the test manager knows that the 'resources' of the test plan dedicated to week x accomplish a certain effort, in number of points, for attempting to perform test cases and a certain effort in number of points, for completing tests case execution.

The test manager chooses the test strategy according to the code to be tested by defining the parameters used to compute the three variables over the test period (the three curves of FIG. 4) and then, displays the progression plan curves of FIG. 5 which are automatically computed using the test plan inputs.

The 'Cumulative Attempted' curve (500) represents the effort used cumulatively by week for executing the cases: it illustrates the test execution velocity.

The 'Cumulative Completed' curve (510) represents the cumulative effort each week to make completed test cases: if the test manager, during the test period see that the results are below expectation, this is a signal for the test manager to analyze the cause of this gap (for instance, the quality of the product is worse then expected and too much time is spent in processing failures).

Figure 6:
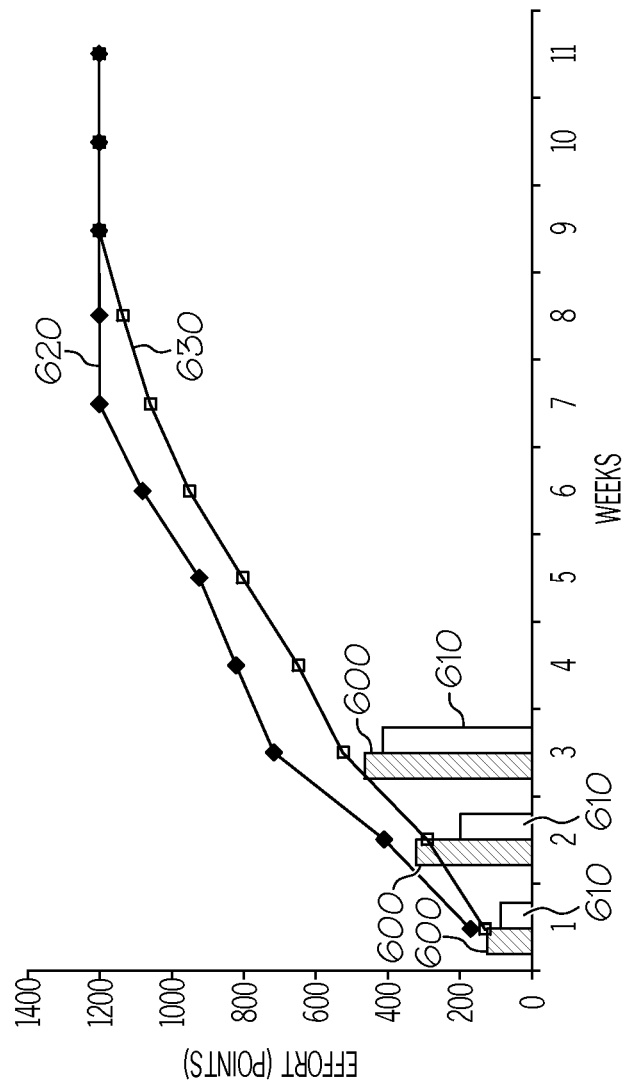
FIG. 6 illustrates the use of the test progression curves with the actual and planned results according to an embodiment of the invention.

FIG. 6 illustrates the use of the test progression curves with the actual and planned results according to an embodiment of the invention. During test execution, the test manager can match the "actual" curve against a planned curve and can decide if the "actual" test result is what is expected. The two bar-chart bars represent the actual attempted (600) and actual completed (610) test curves. The graph lines represent the planned attempted (620) and the planned completed (630) test curves. The test manager can compare the actual test progression by checking if the actual results are as expected.

One skilled in the art will realize that there is a great advantage of using two such curves during test execution to see how the use of resources fits or does not fit to the expected use of resources. If the resources for attempted test is in line with the attempted curve, but not with the completed curve this means that more resources will be needed to complete testing in the future. Test Case can be moved in a "complete" status as soon as it has been "attempted" and it has been executed with "success". If a Test Case is "attempted" but it fails, it needs either to be simply rerun with success or the code needs to be changed to fix the problem. Until the rerun is done successfully or the code is fixed, the test case is not 'complete' and the result for one week may be under the 'complete' curve.

If the result attempt cumulative curve fits the planned attempt cumulative curve this is a good result however, if in parallel the result complete cumulative curve is under the planned complete cumulative curve this means there is a need to have more resources to manage defect.

This use of the progression plan curves is known in the art. However, the curves automatically computed as described in reference to FIG. 3, give more accurate results than the computation of progression plan as described in prior art using S-curves or a linear function. Furthermore, by setting the parameter values for three variables as described in FIG. 4, the test manager modelizes the test plan strategy. This modelization will be taken into account for computation of the final progression plan curves. It may happen also that the test manager, while the test has already started, has to adapt for instance the test strategy by changing Effectivness, for instance, at the end of the test. The attempted and completed plan progression curves will be redrawn accordingly.

Figure 7:
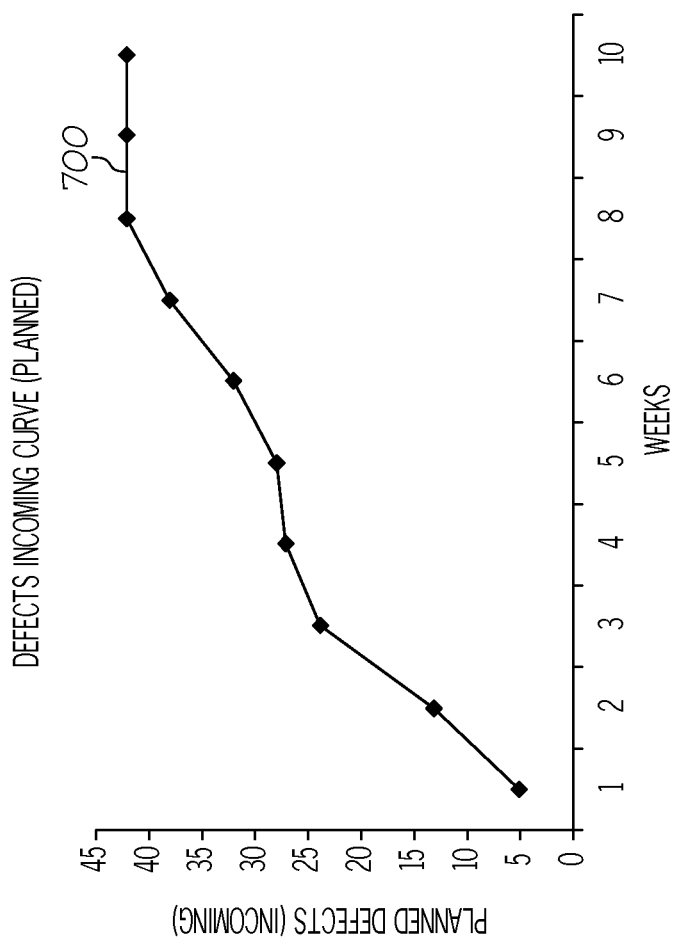
FIG. 7 is an example of Defect Plan Curve computed according to an embodiment of the invention.

FIG. 7 is an example of Defect plan curve computed according to an embodiment of the invention. The Defect Plan curve (700), which is also a cumulative curve, provides the number of incoming cumulative number of defects per week. It can be drawn by the test manager using the Progress Plan curve tool (170) once the progression plan is computed, before and during the test period. In case the quality of the product in poor (for example, because curve 510 is not acceptable), by looking at the curve, the test manager can understand if this is due to an increasing number of defects.

Once again, the defect incoming curve is used to verify that the test is under control: by comparing the actual and planned incoming defect curves (as in FIG. 6 for the test progression curves) the test manager can check if the number of defects in the product is as expected and that the effort to manage defects is within the plan. If the actual curve tends to go over the planned curve there is an alarm advising that the code looks to be more unstable than planned which in turn means that more effort will be needed to manage defects: in this case the test execution runs a risk of slowing down in respect to the plan.

The invention claimed is:

1. A method for automatically creating a progression plan for a software test over a test period comprising a plurality of test period units x, the software test having a predetermined number of planned test resources Rx per each test period unit x, the method comprising for each test period unit x:

recursively computing a test attempted effort ATTx representing an amount of effort spent by the planned test resources Rx to attempt to perform test unit execution, wherein ATTx is based on the planned test resources Rx and on the a test regression effort REGx representing an amount of effort spent by the planned test resources Rx to manage one or more defects found in the test period unit x−1;

computing a test completion effort CCx representing an estimate of the effort spent by the planned test resources Rx for completing test unit execution, wherein the test completion effort CCx is based on the test attempted effort ATTx and the test regression effort REGx, the test completion effort CCx computed for each test period unit x; and automatically creating the progression plan for the software test over the test period based on the computed test attempted effort ATTx and the computed test completion effort CCx.

2. The method of claim 1 in which the number of planned test resources Rx is computed using as inputs a number of test units to be executed, a number of planned defects to be managed, a number of testers involved for performing the test, a time for managing a defect retrieved from historical data, and a time for performing a test unit retrieved from historical data.

3. The method of claim 1, wherein the test regression effort REGx is recursively computed using a predefined initial value for an initial time period unit, the step of computing the test regression effort REGx comprising:

computing a number of incoming defects Dli expected in the test period units from i=1 up to x−1, the number of incoming defects Dli expected in the test period unit i being determined from the test attempted effort ATTi−1 for time period unit i−1, and further being determined from a number of planned defects to be managed, a number of test units to be executed, a time to manage defect, and a time for performing a test unit, and, computing the regression test effort REGx for period unit x from the sum of incoming defects Dli expected in the test period units from i=1 up to x−1 and an average time for managing one defect.

4. The method of claim 3 wherein the number of incoming defects Dli expected in the test period unit i is determined according to the following formula, for i=1 to x:

D$l_i$=ATT$i$* (total_number_of planned defects/(total test cases * time to execute test case +total_number_of planned defects* time to manage defect)).

5. The method of claim 1, further comprising defining for each test period unit x an expected Defect Density arrival rate Dx during the test period unit x, and wherein computing the number of incoming defects Dli expected in the test period unit i is determined according to the following formula, for i=1 to x:

D$l_i$=D$i$* ATT$i$* (total number of planned defects to be managed for the test /(total test cases * time to execute test case +total_number_of planned defects* time to manage defect)).

6. The method of claim 5 wherein the Defect Density arrival rate Dx for each test period unit x is computed as:

$$D_x = 1 \frac{1}{\sqrt{2\pi\sigma^2}} e^{\left(\frac{(x-\mu)^2}{2\sigma^2}\right)}$$

where the value of parameters σ and μ is set according to a defect removal efficiency expected.

7. The method of claim 6, wherein the test regression effort REGx for period unit x is determined according to the following formula :

REGx=SD$l_i$($i$ =1... x−1)* average time for managing one defect.

8. The method of any claim 7, further comprising defining for each test period unit x a Verify rate value Vx which is a percentage of resources for managing defects, and wherein computing said the test regression effort REGx for period unit x according to the following formula :

REGx=Vx* (SD$l_i$($i$=1... x−1)* average time for managing one defect).

9. The method of claim 8 wherein the Verify rate value Vx for each test period unit is computed as:

$V_x = \log_a x$ wherein the parameter a is a decimal value greater or equal to 1 which is set according to a verification strategy.

10. The method of claim 1, wherein the test attempted effort ATTx and the test completion effort CCx of the progression plan are computed according to the following equations:

ATTx=Rx−REGx.

CCx=REGx+ATTx—D$l_x$* average time for managing one defect.

11. The method of claim 1, further comprising defining for each test period unit x an Effectiveness Ex of a test team which represents an efficiency during the test period unit x, and wherein computing the test attempted effort ATTx and the number of test completion effort CCx of the progression plan according to the following equations:

ATTx=Ex * Rx−REGx.

CCx=REGx+ATTx—D$l_x$* average time for managing one defect.

12. The method of claim 11 wherein the Effectiveness Ex for each test period unit is computed as follows:

$$E_x = \frac{1}{\sqrt{2\pi\sigma^2}} e^{\frac{(x-\mu)}{2\sigma^2}}$$

wherein the value of parameter σ is set according to the a variation of effectiveness expected over time and the value of parameter μ is set according to a time when a maximum effectiveness of the test team is expected.

13. The method of claim 1, further comprising computing and generating a display of the following vatiables:

a sum of the test attempted effort ATTx from test period unit 1 to x:

SATT$i$ ($i$=1 . . . x);

a sum of the test completion effort CCx from test period unit 1 to x:

S CC$i$ ($i$=1. . . x); and a sum of the test regression effort REGx+1 from test period unit 0 to x−1:

SREGx+1 ($i$=0 . . . x−1).

* * * * *